(12) United States Patent
Maur et al.

(10) Patent No.: US 7,318,200 B2
(45) Date of Patent: Jan. 8, 2008

(54) MASTER DATA FRAMEWORK

(75) Inventors: Thomas Maur, Neuwied (DE); Michael Hladik, Walldorf (DE); Markus Roeckelein, Angelbachtal (DE)

(73) Assignee: SAP AG, Walldorf (DE)

( * ) Notice: Subject to any disclaimer, the term of this patent is extended or adjusted under 35 U.S.C. 154(b) by 595 days.

(21) Appl. No.: 10/865,143

(22) Filed: Jun. 9, 2004

(65) Prior Publication Data

US 2005/0278645 A1  Dec. 15, 2005

(51) Int. Cl.
*G06F 13/00* (2006.01)
*G06F 15/00* (2006.01)

(52) U.S. Cl. .................. 715/765; 715/764

(58) Field of Classification Search .......... 715/762, 715/765, 700, 743, 799, 817, 764; 705/34, 705/35

See application file for complete search history.

(56) References Cited

U.S. PATENT DOCUMENTS

2004/0230508 A1* 11/2004 Minnis et al. .............. 705/35

* cited by examiner

*Primary Examiner*—Cao (Kevin) Nguyen
(74) *Attorney, Agent, or Firm*—Kenyon & Kenyon, LLP

(57) ABSTRACT

A system for organizing data is provided that includes a default template library and a universe of fields, each of the fields selectable by a user to apply to a particular modifiable template. The default template library includes a plurality of modifiable templates adapted to describe financial transactions. The system may further includes a processor adapted to relate business data according to a plurality of relations established by the particular modifiable template. The template relates the subset of fields to describe a financial transaction. A method is provided for structuring financial data in a database of transactions that includes selecting a template of a transaction and selecting at least one field for the financial data from a set of fields associated with the template to form a customized template. The customized template describes a relationship between the financial data.

15 Claims, 6 Drawing Sheets

MASTER DATA FRAMEWORK

FIELD OF THE INVENTION

The present invention relates to computer software. More particularly, the present invention relates to a program for modifying business applications used by financial institutions.

BACKGROUND INFORMATION

A bank analyzer application may be used by banks or financial institutions. Prior to full-scale use, the application may need to be customized by a specialist or partner, who may be a consultant with expertise in the banking industry. Thus, while the bank analyzer application may be designed to manage business processes of a bank, it may require the partner to tailor the application to the particular data structures and implementation details of a specific customer.

Conventional banking products may be based on several components that may be merged to develop a common data structure. The applications may not be convenient for customers or the specialists because the applications may be hard-coded. Applications intended for use with loans, for example, may work only with loans. It may be difficult to use the application with customer-centric data structures.

There thus is a need for a method of enabling banks to easily customize business applications to fit their particular needs.

DETAILED DESCRIPTION

A master data framework is provided by an exemplary embodiment of the present invention. The master data framework is a data model for banking information that is flexible and extensible. There may be few static, predefined data structures. Instead, a developer may set up a list (or lists) of attributes during customization to match the application to the customer's data model. Several different functions may be provided by the master data framework.

The framework provided for handling transactions and other master data objects may be flexible and may be enhanced by the customer. The enhancement concept allows customers to implement their own fields within the master data framework.

The framework allows standard fields provided in the system to be grouped together with fields and characteristics created by the customer. Basic templates may be assigned to structured templates to form a hierarchy. Templates may be defined in a customizing function at a single-version level. This may ensure that the data in the customizing function is consistent with the data in the application. At the template version level, it may be possible to store default values and field selection control (such as required fields or optional fields) for appropriate fields.

The template categories delivered to the user may give structure to the fields delivered with the system. The fields supplied may be grouped into related units, for example attributes for handling financial terms and conditions, lines, and business partner relationships. Actual characteristic values may be maintained on the basis of the defined templates.

The configuration process may be guided by templates and objects. The user may define the entities, in which the characteristics and key figures are supplied for a primary object. In other words, the source systems may not send characteristics and key figures individually, but instead may send them grouped into business entities. These business entities may be called templates in a financial database, and may be used in conjunction with the following primary objects: financial transaction; financial instrument; account; settlement account; securities position account; customer position account; G/L account; country; hedging relationship; and/or physical asset.

During customization for a particular type of entity, a developer may first develop an entity template. For loans, the developer may generate a loan template. A library of default parameters for each entity type may be provided in the form of predetermined templates, as illustrated in FIG. 1.

Figure 1:
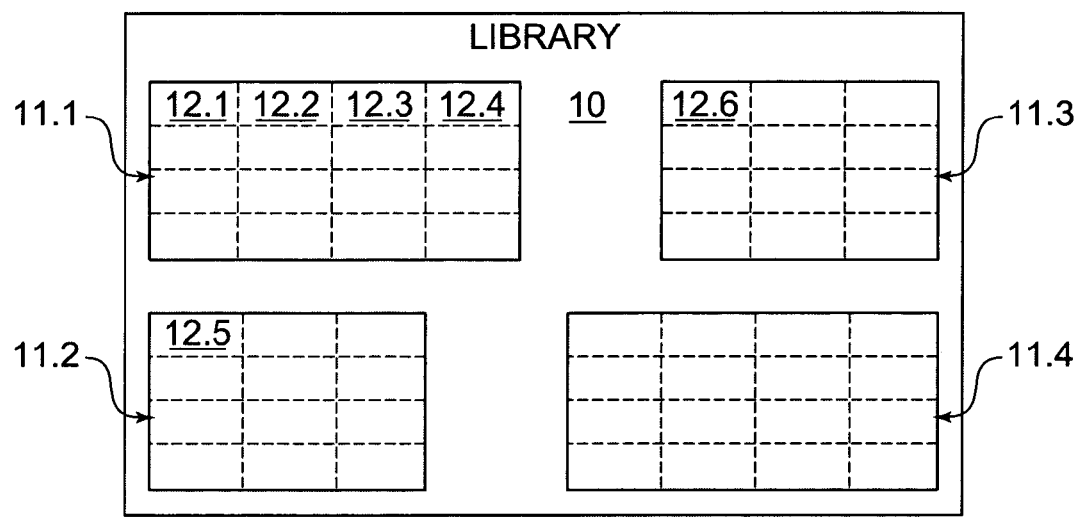
FIG. 1 illustrates a library of templates for an exemplary embodiment of the present invention.

FIG. 1 illustrates library 10 of templates 11.1, 11.2, 11.3, 11.4. Library 10 may be provided in a software application to a customer, for instance, a bank. Templates 11.1, 11.2, 11.3, 11.4 may represent standard and/or fundamental transactions. For instance, template 11.1 may represent a personal loan, template 11.2 may represent a mortgage, template 11.3 may represent a line of credit, and template 11.4 may represent a savings account. Alternatively, templates 11.1, 11.2, 11.3, 11.4 may represent any other type of transaction. Each of templates 11.1, 11.2, 11.3, 11.4 includes attributes 12. For example: template 11.1 includes, among others, attributes 12.1, 12.2, 12.3, 12.4; template 11.2 includes, among others, attribute 12.5; and template 11.3 includes, among others, attribute 12.6. Each of attributes 12 is a field in a set of fields available throughout the financial database. For instance, attribute 12.1 may represent an amount of the personal loan described by template 11.1. Additionally, attribute 12.2 may represent a term of the loan, attribute 12.3 may represent an interest rate for the loan, and attribute 12.4 may represent a prepayment penalty for the loan. Additionally, any other possible combination of attributes 12 may be used in template 11.1. Attributes 12 may be distinct between templates 11, or alternatively may be common between templates 11. For instance, template 11.2, which represents a mortgage, may also have attributes 12 representing an amount, term, and/or interest rate of the mortgage.

The developer may access the library and select one of the predetermined templates. The developer may select which fields from predefined field groups (also referred to as service modules) are activated. In the application, the product defines a universe of all field types that can possibly apply to a given entity. When the developer activates certain fields, the template simply records flags to distinguish those fields that are active and those fields that are not active.

Templates may also have several versions. The various template versions may reference each other in a tree structure, such as the one shown in FIG. 2. Thus, the tree may include layers. At root layer 21, default template 24 identifies fields that are common to all templates below it. At the first layer below the root (template layer 22), templates 25.1, 25.2 may tailor default template 24 for specific applications. Each successive layer may modify the template definition at the immediately preceding layer to accommodate some particular application.

Figure 2:
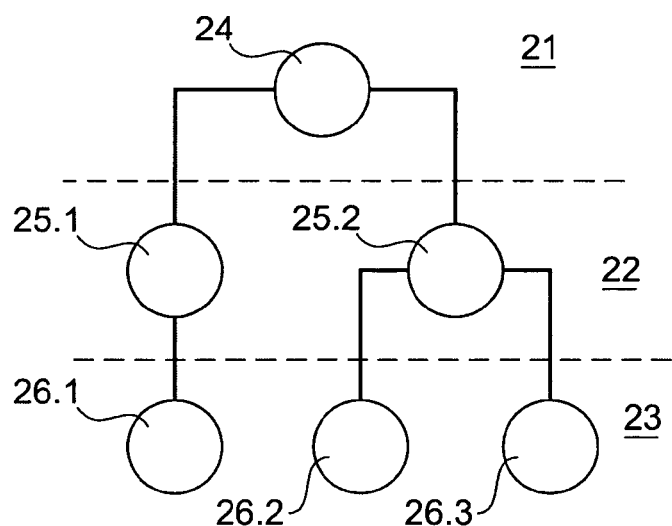
FIG. 2 illustrates an exemplary architecture of an exemplary embodiment of the present invention.

FIG. 2 illustrates an exemplary architecture of an exemplary embodiment of the present invention. Root layer 21 represents a library of default templates. Default template 24 is modified by a user to provide templates 25.1 and 25.2 in template layer 22, which represents a set of conventional transactions for the consumer or bank. Template version layer 23 represents a layer of template versions 26.1, 26.2, 26.3 of the templates shown in template layer 22.

For instance, default template 24 may be a loan, and template 25.1 may represent a personal loan while template 25.2 may represent a mortgage (the personal loan and mortgage being variations of default template 24, the loan). Template version 26.1 may represent a version of template 25.1, and may represent a personal loan having no prepayment penalty. Template versions 26.2 and 26.3 may represent versions of template 25.2, and may represent two versions of a mortgage. For instance, template version 26.2 may be a fixed-rate mortgage and template version 26.3 may be a variable rate mortgage.

The templates themselves do not represent transactions. Using the example of a loan template, each object using the template may represent a particular loan. Each particular loan may be represented by a separate object that fills the relevant fields with the specific information that defines the loan. The loan object may include a header that identifies the template and the version to which it applies. Thus, a bank's computer system may store many loan objects, each of which refers to a particular type of loan template/version.

Root layer 21 need not relate directly to a specific type of transaction (e.g., loans) performed by a bank. There may be several templates, with each template devoted to a type of loan. Thus, there may be several templates established in parallel for a given transaction type, each of which will include their own default template 24 in root layer 21.

The templates may be modified even after the customization process is finished, and after the bank begins to use the templates on live data. Revising the template results in a new version of the template.

The system may need to be able to redo old applications and operate on historical versions. The system may maintain two dates for each data object: a 'business date' and a 'system date.' The business date may identify the date for which the object version is effective. For example, a user may enter transaction data after the transaction has been completed and indicate that the new data became effective at some particular date in the past.

The system date is assigned by the computer system itself and cannot be changed by a user. The system date is a timestamp that indicates when a data object was created. This creates a two dimensional time line that is relevant for certain searches, a graphical illustration of which is shown in FIG. 3.

For example, assume that on Mar. 11, 2004, data is entered for a transaction that actually occurred on Mar. 11, 2004. The business date and the system date would be identical, Mar. 11, 2004. Assume further that transaction 33 was entered incorrectly (for instance, value A) and on Jun. 1, 2004 the error was corrected to become transaction 34 (for instance, changed to value B). In this situation, the business date remains the same but the system date changes to Jun. 1, 2004.

Figure 3:
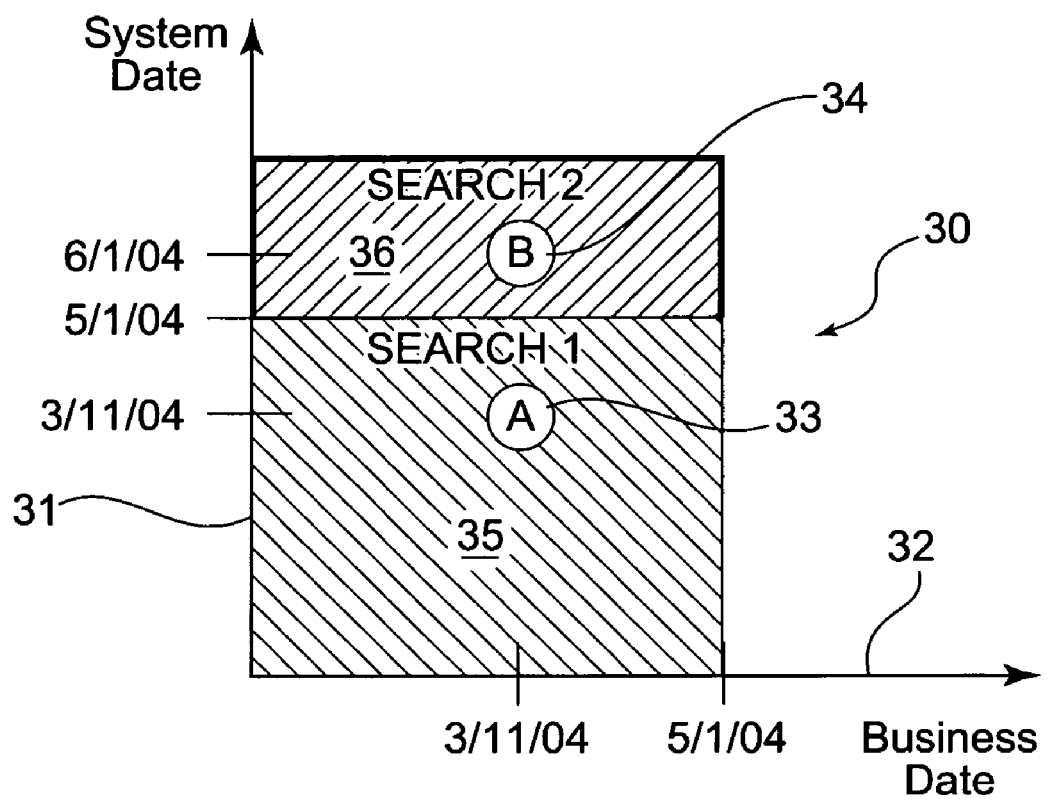
FIG. 3 illustrates graphically an exemplary method of searching a database according to an exemplary embodiment of the present invention.

FIG. 3 illustrates in graph 30 the previously-discussed example in regards to searching a database in an exemplary embodiment of the present invention. Graph 30 includes y-axis 31 for the system date and x-axis 32 for the business date. FIG. 3 illustrates search 35 for all transactions having a business date of May 1, 2004 or earlier and a system date of May 1, 2004 or earlier (search 1 in FIG. 3). Search 35 would identify the incorrectly entered transaction 33 (value A) having a system date of Mar. 11, 2004. Search 36 identifies a business date of May 1, 2004 and a system date later than Jun. 1, 2004 (search 2 in FIG. 3). Search 36 would identify transaction 34 (value B), and would ignore transaction 33 (value A).

This feature permits the system to run historical searches. The system can not only re-run a particular search but it also can re-run the search using data as it existed on a specified date.

Figure 4:
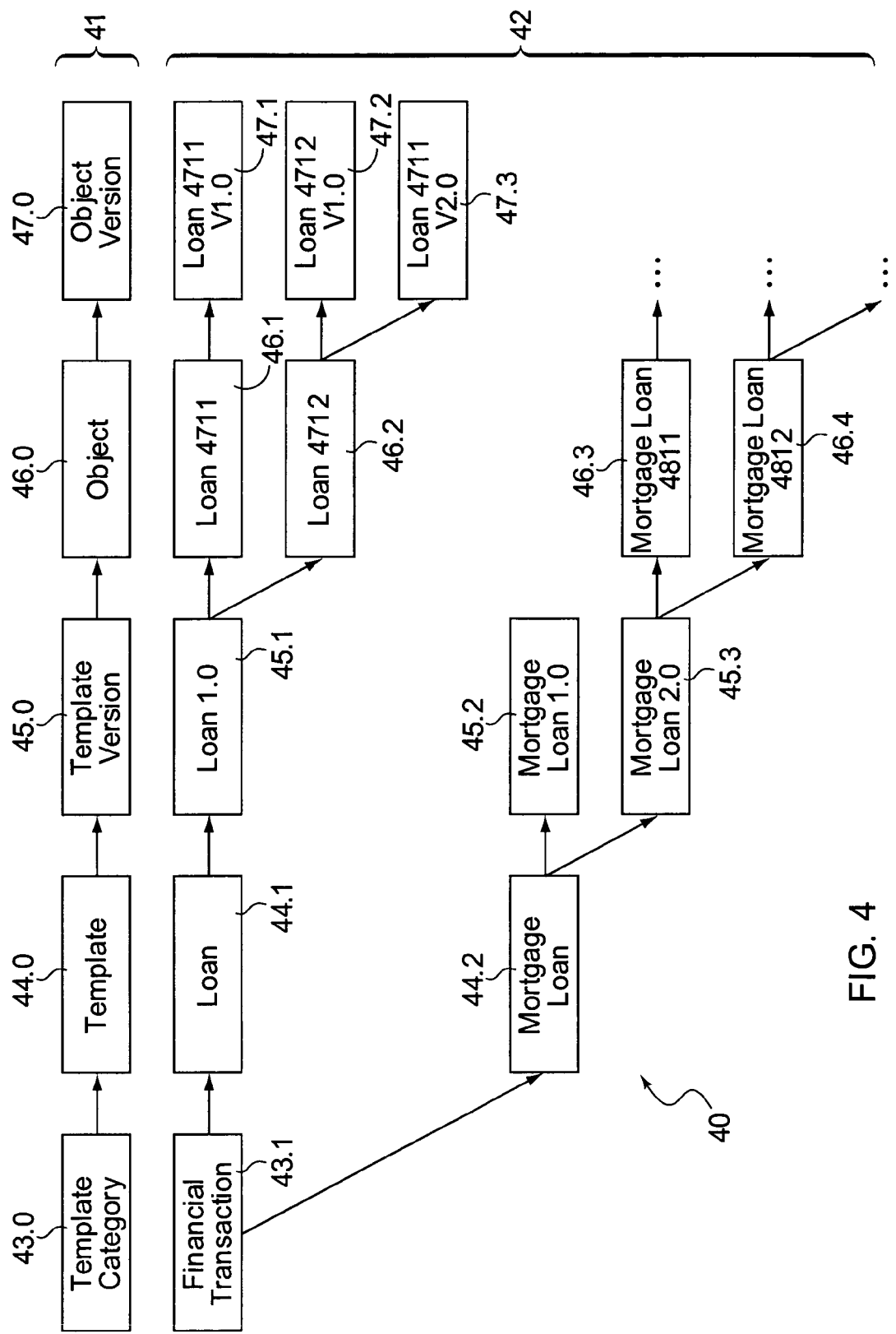
FIG. 4 illustrates a structure of an implementation of an exemplary embodiment of the present invention.

FIG. 4 illustrates structure 40 of an implementation of an exemplary embodiment of the present invention. Header 41 is divided into categories, including template category 43.0, template 44.0, template version 45.0, object 46.0, and object version 47.0. Framework 42 is aligned with the categories of header 41, and includes the details of the specific templates and objects, and versions of each, for the database. For instance, financial transaction 43.1 corresponds to template category 43.0. Loan 44.1 and mortgage loan 44.2 are linked to financial transaction 43.1 and correspond to template 44.0. In other words, loan 44.1 and mortgage loan 44.2 are templates that may have been created from the general template category (also called a default template) of financial transaction 43.1. Loan 1.0 is template version 45.1 and is linked to template 44.1, while mortgage loans 1.0 and 2.0 (template versions 45.2 and 45.3, respectively) are linked to template 44.2. This structure continues. with the actual loans (objects) that correspond to the template versions, and then object versions that correspond to the objects. For instance, objects 46.1 and 46.2 both link to template version 45.1 and fall under the header of object 46.0. Object versions 47.2 and 47.3 link to object 46.2 and fall under the header of object version 47.0.

Templates may include a set of rules for creating primary objects. A template may be described by its attributes. A template category defines which attributes are permitted for describing a primary object. The names of the template categories may match the names of the primary objects listed above. The template categories may each provide a fixed number of attributes for defining templates that represent business entities such as loans, swaps and stocks. A specific real-world occurrence of a template (for example, the loan contract with contract number 4711 of object 46.1 shown in FIG. 4) is called an object.

The structures of templates and objects are described in the following discussion. New, more complex templates may be created by combining templates. This provides a building block for constructing hierarchically structured templates. Templates may need to be combined, for example, for loans that have additional notice options or unscheduled repayment options. If a template is not the result of combining other templates, it is called an elementary template. In contrast, structured templates may be composed of sub-templates, which in turn may be structured themselves.

A similar approach may be adopted for creating objects, because objects represent specific occurrences of templates.

Objects that result from elementary templates may be called elementary objects, while objects that result from structured templates may be called structured objects. Consequently, structured objects are composed of individual sub-objects. Here, the object itself forms the root of the hierarchical structure derived from the template, and each sub-object represents a node that is assigned to a version of the corresponding sub-template. As is the case for the object itself, the settings of the template configuration can also be derived for all sub-objects since they have a unique reference to a template version. Structured objects are only valid in their entirety; the individual sub-objects are not independent entities.

Creating and managing versions for objects is described in the following discussion. Changing the attributes of a template may have far-reaching implications, since a template may have been used as the basis for creating a large number of objects. For example, by changing the field selection for an attribute from "inactive/not relevant" to "required field," all the objects that exist for this template may become inconsistent. For this reason, one template may have several template versions. A template version may operate to "freeze" the status of a template. If the data for a certain template changes during configuration, a new version may be used.

When the field contents for an object are changed, a new object version may be generated automatically. This means that the object values may never be overwritten and all the changes made to a specific object may be traced using the object versions. This feature is illustrated in FIG. 4.

Figure 5:
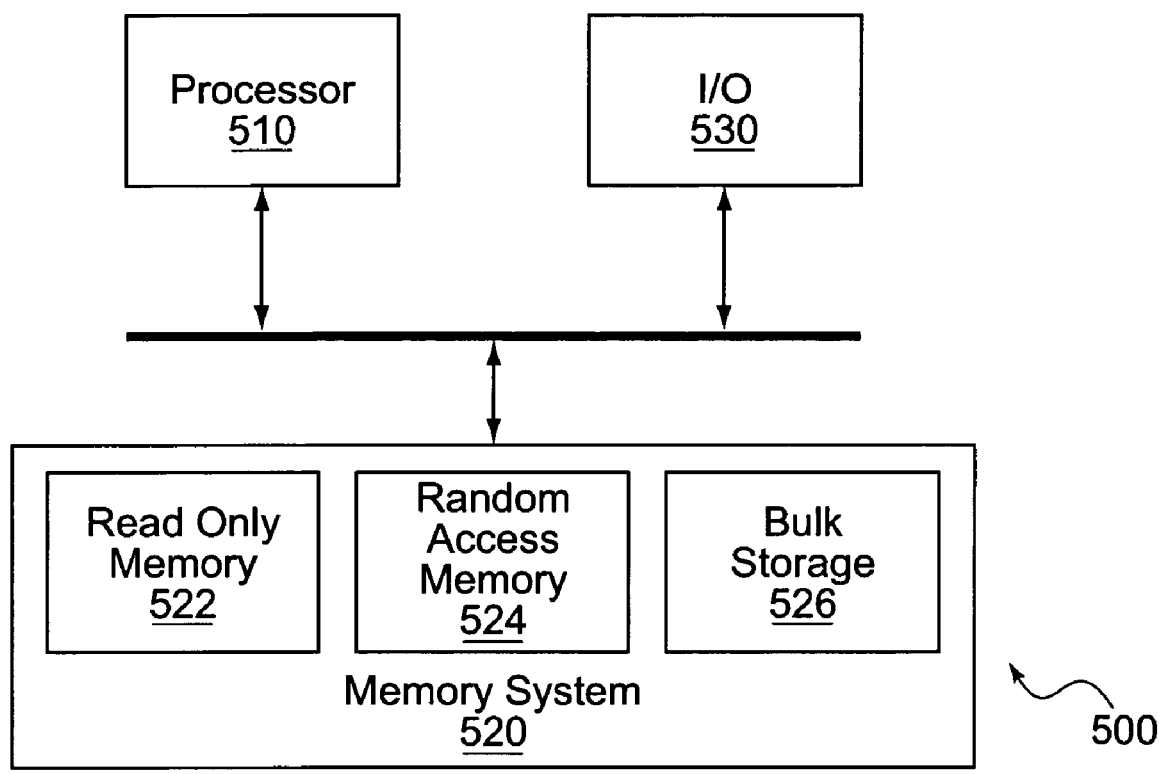
FIG. 5 illustrates an architecture of an exemplary embodiment of the present invention.

FIG. 5 illustrates an architecture of an exemplary embodiment of the present invention. The functionality of the foregoing embodiments may be provided on various computer platforms executing program instructions. One such platform 500 is illustrated in the simplified block diagram of FIG. 5. There, the platform 500 is shown as being populated by a processor 510, a memory system 520 and an input/output (I/O) unit 530. The processor 510 may be any of a plurality of conventional processing systems, including microprocessors, digital signal processors and field programmable logic arrays. In some applications, it may be advantageous to provide multiple processors (not shown) in the platform 500. The processor(s) 510 execute program instructions stored in the memory system. The memory system 520 may include any combination of conventional memory circuits, including electrical, magnetic or optical memory systems. The memory system may include read only memories 522, random access memories 524 and bulk storage 526. The memory system not only stores the program instructions representing the various methods described herein but also can store the data items on which these methods operate. The I/O unit 530 would permit communication with external devices (not shown).

Figure 6:
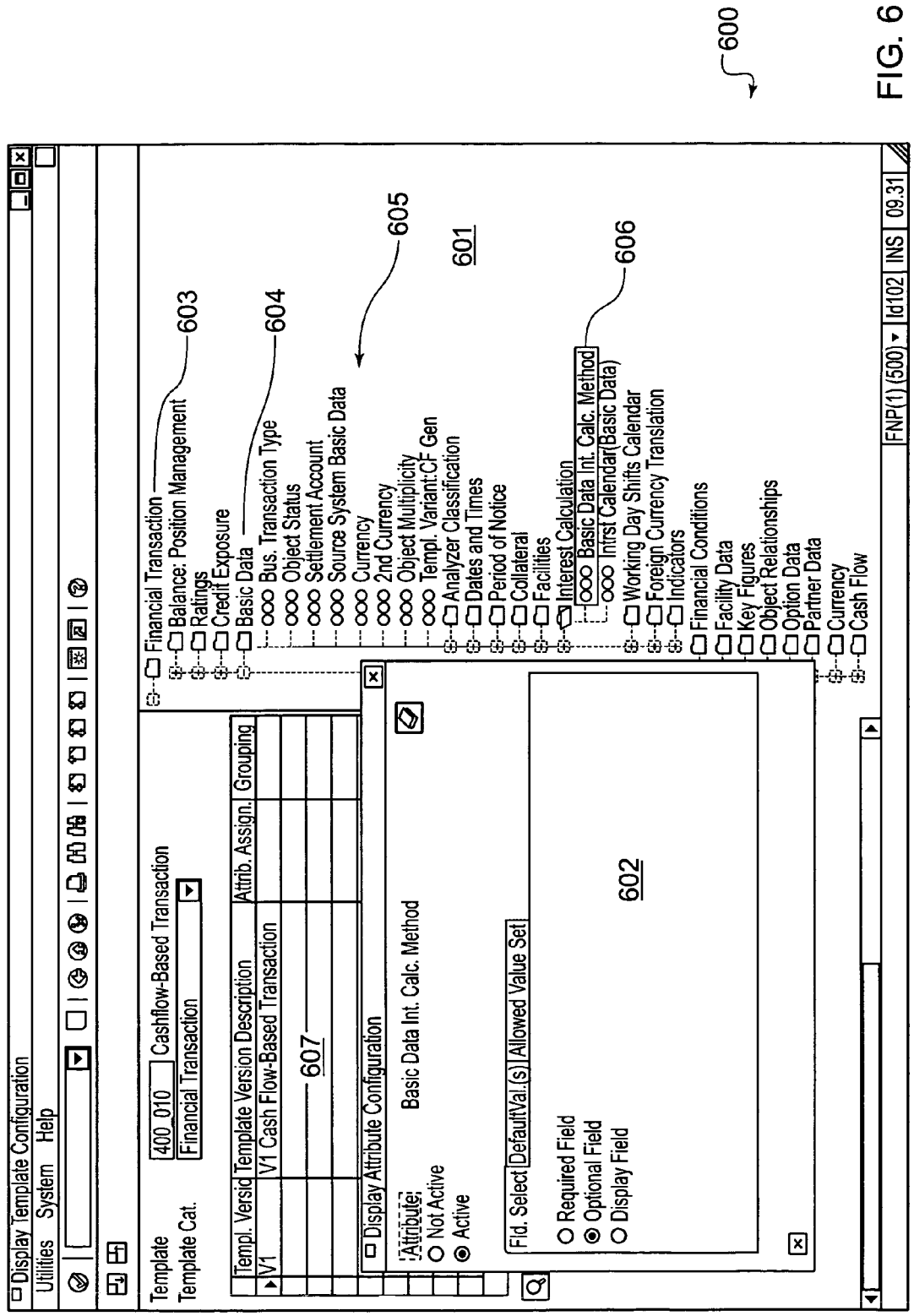
FIG. 6 illustrates a screenshot of an exemplary embodiment of the present invention showing the customization of a template through the selection of fields.

FIG. 6 illustrates a screenshot of an exemplary embodiment of the present invention showing the customization of a template through the selection of fields. Display area 600 includes on the left half template/template version display 607 and on the right field universe display 601. Within field universe display 601, template category 603 is displayed at the top, and corresponds to the template category shown in template/template version display 607 (in this case, financial transaction). Under template category 603 are several datasets including dataset 604, entitled basic data. Under dataset 604 are fields 605, which are particular fields able to be applied to template category 603. Field calculation method 606 is highlighted in field universe display 601, indicating that it has been selected to be reviewed and/or modified. Since, field calculation method 606 is highlighted, superimposed over template/template version display 607 is attribute configuration dialog box 602. Attribute configuration dialog box 602 allows the field selected in field universe display 601 to be selected and/or customized for the template or template version.

Figure 7:
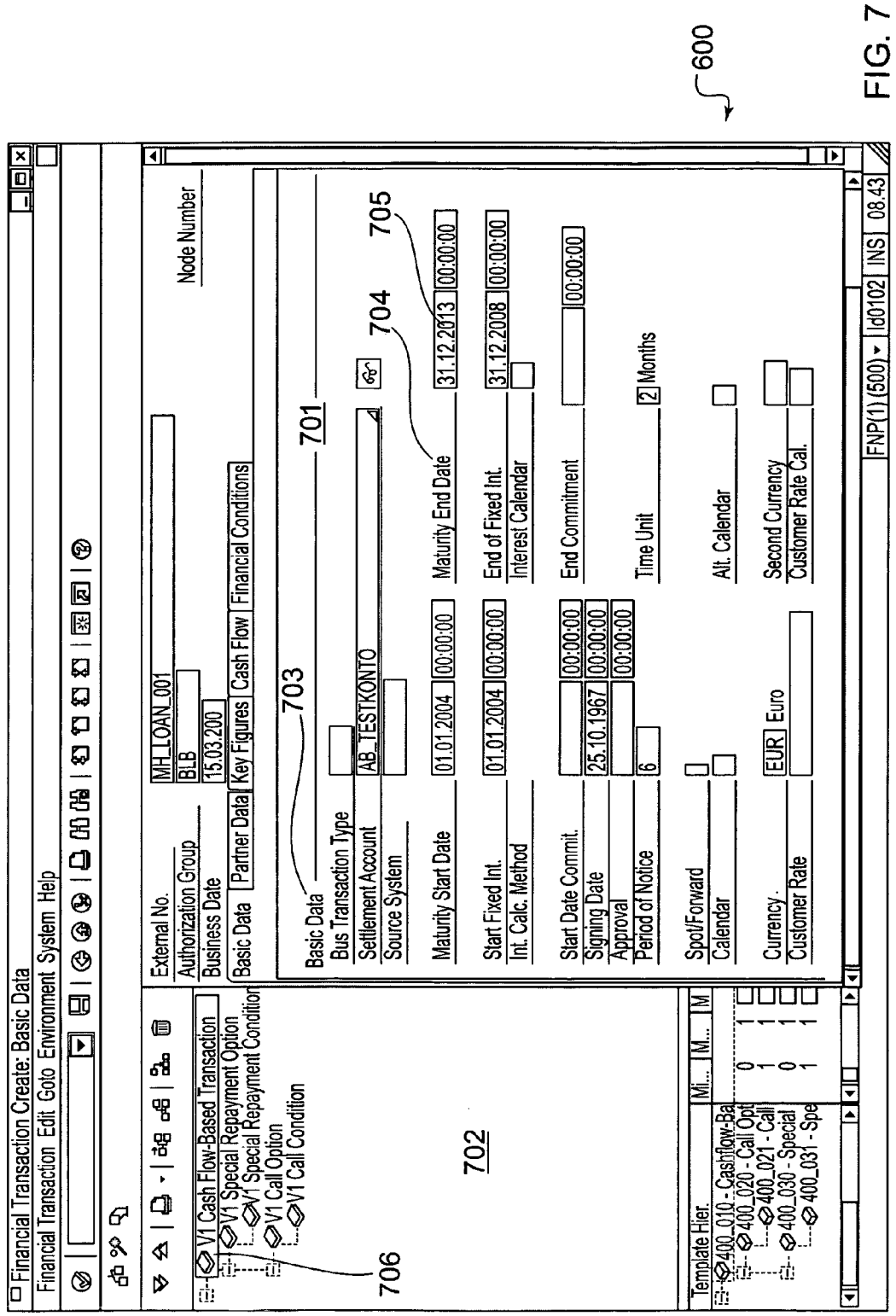
FIG. 7 illustrates a screenshot of an exemplary embodiment of the present invention showing the creation of transaction data using a template.

FIG. 7 illustrates a screenshot of an exemplary embodiment of the present invention showing the creation of transaction data using a template. Display area 600 is divided into several parts, including object node display area 702 and data input display area 701. Highlighted in object node display area 702 is object node 706, entitled cash flow-based transaction. Title 703, entitled basic data, is shown in the data input display area 701 and corresponds to the highlighted object node, in this case object node 706. Within data input display area are various attributes falling under title 703. In particular, attribute 704, entitled maturity end date, is displayed. Adjacent to attribute 704 is input data field 705, which allows the user to input the particular data for attribute 704 for object node 706.

An additional feature of an exemplary embodiment of the present invention relates to the release procedure using dual control. This feature provides a validation of modifications to transaction data, and confirms shared responsibility between the person entering the data and their supervisor(s) and/or auditor(s). According to some bank guidelines, for example, one or more employees may need to be designated to check the entries made by a user creating data to ensure that the data entries are accurate. In addition, certain approval powers may be defined for the employees in a bank (such as who is permitted to grant which limits to customers and enter them in the system). The release functionality for data entries of the present invention may support the correct handling of these approval power regulations. Moreover, the auditors and/or controllers may track which employees have released data entries, making them jointly responsible for the results.

While the present invention has been described in connection with the foregoing representative embodiment, it should be readily apparent to those of ordinary skill in the art that the representative embodiment is exemplary in nature and is not to be construed as limiting the scope of protection for the invention as set forth in the appended claims.

What is claimed is:

1. An apparatus for organizing data, comprising:
a template library comprising a plurality of modifiable templates adapted to describe financial transactions;
a set of fields, each of the fields selectable by a user to apply to a particular modifiable template, wherein the set of fields defines each type of business data;
a processor adapted to:
respond to receiving business data corresponding to a business transaction, creating an object based on a customized template for the business transaction, the customized template including a plurality of selected fields for the business data, and defining relationships among the business data, and wherein the customized template has a first version, and wherein the business data defining a business date for the business transaction;
store the object in a financial database, wherein the object includes a reference to the customized template, and wherein the object is stored with a first system timestamp, and wherein the object is stored with the business date;

respond to receiving alternative business data for the business transaction, creating a modified object based on the customized template and the alternative business data;

store the customized object in the financial database, wherein the customized object is stored with a second system timestamp, wherein the second system timestamp is chronologically later than the first system timestamp.

2. The system of claim 1, wherein the process is further adapted to: a user interface adapted to at least one of:

modify the modifiable templates to form a template version;

select a set of fields associated with the template version from the universe of fields;

create at least one new field to be added to the universe of fields;

input the business data in the set of fields associated with the template version; and validate a modification in the business data by a supervisor.

3. The system of claim 1, wherein the processor is adapted to search the memory for the business data based on the business date.

4. A computer program stored on a memory configured to be executed by a computer, the computer program comprising program code for executing a method for customizing a database, the method including the steps of:

responsive to receiving business data corresponding to a business transaction, creating an object based on a customized template for the business transaction, the customized template including a plurality of selected fields for the business data, and defining relationships among the business data, and wherein the customized template has a first version, and wherein the business data defining a business date for the business transaction;

storing the object in a financial database, wherein the object includes a reference to the customized template, and wherein the object is stored with a first system timestamp, and wherein the object is stored with the business date;

responsive to receiving alternative business data for the business transaction, creating a modified object based on the customized template and the alternative business data;

storing the customized object in the financial database, wherein the customized object is stored with a second system timestamp, wherein the second system timestamp is chronologically later than the first system timestamp.

5. The computer program of claim 4, wherein the method further comprises defining by a user at least one consistency check, the consistency check adapted to determine if an error has occurred in inputting the business data.

6. The computer program of claim 4, wherein the method further comprises defining by a user at least one validation requirement, the at least one validation requirement authorizing by a supervisor a modification in the business data.

7. The computer program of claim 4, wherein the method further comprises defining by a user at least one authority check, the authority check adapted to require an authorization by an authority to change the business data.

8. The computer program of claim 4, wherein the method further comprises displaying the object.

9. The computer program of claim 4, wherein the method further comprises creating new fields by a user, the new fields being added to the set of fields.

10. A method for structuring, storing and managing financial data in a database of transactions, comprising:

responsive to receiving business data corresponding to a business transaction, creating an object based on a customized template for the business transaction, the customized template including a plurality of selected fields for the business data, and defining relationships among the business data, and wherein the customized template has a first version, and wherein the business data defines a business date for the business transaction;

storing the object in a financial database, wherein the object includes a reference to the customized template, and wherein the object is stored with a first system timestamp, and wherein the object is stored with the business date;

responsive to receiving alternative business data for the business transaction, creating a modified object based on the customized template and the alternative business data;

storing the customized object in the financial database, wherein the customized object is stored with a second system timestamp, wherein the second system timestamp is chronologically later than the first system timestamp.

11. The method of claim 10, where the customized template is defined by:

receiving a template selection for a business transaction;

receiving a first field selection from the plurality of fields to store financial data;

adding the field to the template to form the customized template with the first version, the customized template describing a relationship between fields added to the custom template;

storing the customized template with the first version.

12. The method of claim 11, further comprising:

modifying the first customized template by adding a second field to form a new version of the customized template, wherein adding the second field defines a relationship between the first and second field;

storing the new version of the customized template with a second version.

13. The method of claim 10, further comprising:

based on a search request including a search system date and a search business date, retrieving from the database the customized object if the search system date is chronologically later or the same as the second system date, else if the search system date is earlier than the second system date, retrieving from the database the object.

14. The method of claim 10, further comprising modifying relations between the at least one field in the template to form a further version of the customized template.

15. The method of claim 10, further comprising archiving at least one of:

the business data and the object; and the alternative business data and the customized object.

* * * * *